United States Patent
Imanishi

(10) Patent No.: US 10,892,497 B2
(45) Date of Patent: Jan. 12, 2021

(54) FUEL CELL MODULE, MANUFACTURING METHOD THEREOF, AND CONNECTOR

(71) Applicant: TOYOTA JIDOSHA KABUSHIKI KAISHA, Toyota (JP)

(72) Inventor: Masahiro Imanishi, Gotenba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/841,174

(22) Filed: Apr. 6, 2020

(65) Prior Publication Data
US 2020/0235407 A1 Jul. 23, 2020

Related U.S. Application Data

(62) Division of application No. 15/966,357, filed on Apr. 30, 2018.

(30) Foreign Application Priority Data

Jun. 22, 2017 (JP) .................. 2017-122241

(51) Int. Cl.
| | | |
|---|---|---|
| H01M 8/0202 | (2016.01) | |
| H01M 8/04537 | (2016.01) | |
| H01M 8/2475 | (2016.01) | |
| H01M 8/0247 | (2016.01) | |

(52) U.S. Cl.
CPC ..... *H01M 8/0202* (2013.01); *H01M 8/04552* (2013.01); *H01M 8/04559* (2013.01); *H01M 8/2475* (2013.01); *H01M 8/0247* (2013.01); *Y02E 60/50* (2013.01)

(58) Field of Classification Search
None
See application file for complete search history.

(56) References Cited

U.S. PATENT DOCUMENTS

| | | |
|---|---|---|
| 2003/0072983 A1 | 4/2003 | Kikuchi et al. |
| 2013/0236805 A1 | 9/2013 | Furuya et al. |
| 2017/0104230 A1 | 4/2017 | Aoki et al. |
| 2018/0241068 A1 | 8/2018 | Imanishi et al. |

FOREIGN PATENT DOCUMENTS

| | | |
|---|---|---|
| JP | 2003123816 A | 4/2003 |
| JP | 2005122911 A | 5/2005 |
| JP | 2012209231 A | 10/2012 |
| JP | 2013-187050 A | 9/2013 |
| JP | 2015-108539 A | 6/2015 |

OTHER PUBLICATIONS

Notice of Allowance dated Sep. 10, 2020 in corresponding U.S. Appl. No. 15/966,357.

*Primary Examiner* — Jonathan Crepeau
(74) *Attorney, Agent, or Firm* — Dickinson Wright PLLC

(57) ABSTRACT

A connector is moved obliquely to a first separator. An optical distance measuring device is used to optically measure an attachment position of the connector while using the first separator as a reference. A reference plane of the first separator is used as a reference. An inspection plane of the connector is also used as a reference. The inspection plane is formed to be parallel to the reference plane in the state that the connector is accurately attached to an attachment portion.

3 Claims, 11 Drawing Sheets

FUEL CELL MODULE, MANUFACTURING METHOD THEREOF, AND CONNECTOR

CROSS-REFERENCE TO RELATED APPLICATIONS

The present application is a divisional application of U.S. application Ser. No. 15/966,357, filed Apr. 30, 2018, which claims priority from Japanese patent application 2017-122241 filed on Jun. 22, 2017, the entirety of the content of which is hereby incorporated by reference into this application.

BACKGROUND

Field

The present disclosure relates to a connector attached to a fuel cell.

Description of Related Art

JP2013-187050A discloses attaching a connector to a cell included in a fuel cell. The connector is attached in order to measure a cell voltage.

In the configuration described above, the connector is attached straight to the cell. Attaching the connector straight means moving the connector substantially orthogonally to an attachment location. The above configuration does not take into account the casing where the connector is attached not straight but obliquely. By taking into account the foregoing, the present disclosure is directed to accurately making an inspection of attachment failure when a connector is attached obliquely to a cell.

SUMMARY

According to one aspect of the present disclosure, there is provided a fuel cell module. The fuel cell module comprises a stack of a plurality of cells; and a connector attached to at least one of the plurality of cells for use in measuring a voltage of the cell. The cell has an approximately rectangular outer shape, and the connector is attached obliquely to an edge of the cell that forms one side of the approximately rectangular outer shape. The connector includes a plane that is arranged parallel to a reference plane that is part of the edge of the cell in an accurately attached state of the connector.

This configuration allows for optical measurement of the parallel planes and thereby accurately makes an inspection of attachment failure.

In the fuel cell module of the above aspect, each of the plurality of cells may include a first separator, a second separator, and an insulating frame that is placed between the first separator and the second separator to isolate the first separator and the second separator from each other. The connector may be attached to the first separator, and the reference plane may be part of the first separator.

In the fuel cell module of this aspect, a location where the connector is attached and a location as a reference of measurement are both included in the first separator. This configuration allows for accurate inspection of attaching failure.

In the fuel cell module of the above aspect, the first separator may include an attachment portion configured to attach the connector, and the attachment portion may be exposed from the insulating frame.

In the fuel cell module of this aspect, since the first separator is exposed from the insulating frame, it allows for accurate inspection of attachment failure.

The present disclosure may be implemented by various aspects other than those described above, for example, a manufacturing method of the fuel cell module or the connector.

DESCRIPTION OF EMBODIMENTS

Figure 1:
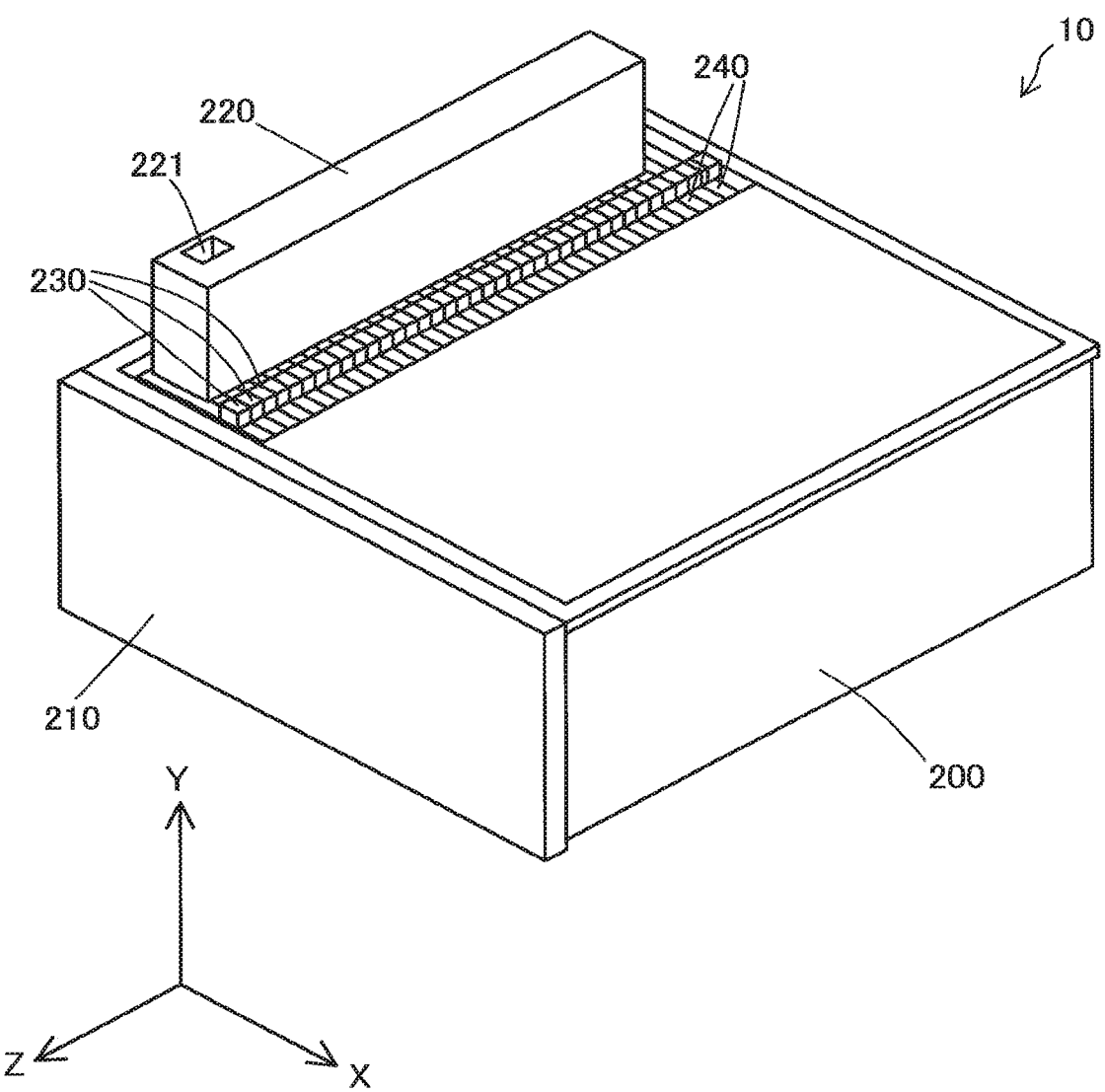
FIG. 1 is a perspective view illustrating a fuel cell module.

The following describes Embodiment 1. FIG. 1 is a perspective view illustrating a fuel cell module 10. A ZX plane is arranged parallel to a horizontal plane. A +Y direction denotes a vertically upward direction, and a −Y direction denotes a vertically downward direction. An XY plane is arranged parallel to a planar direction of cells 240. A Z direction is parallel to a stacking direction of the cells 240.

The fuel cell module 10 includes a casing 200, an end plate 210, a monitor 220, a plurality of connectors 230 and a plurality of cells 240. The number of the connectors 230 is equal to the number of the cells 240.

Figure 5:
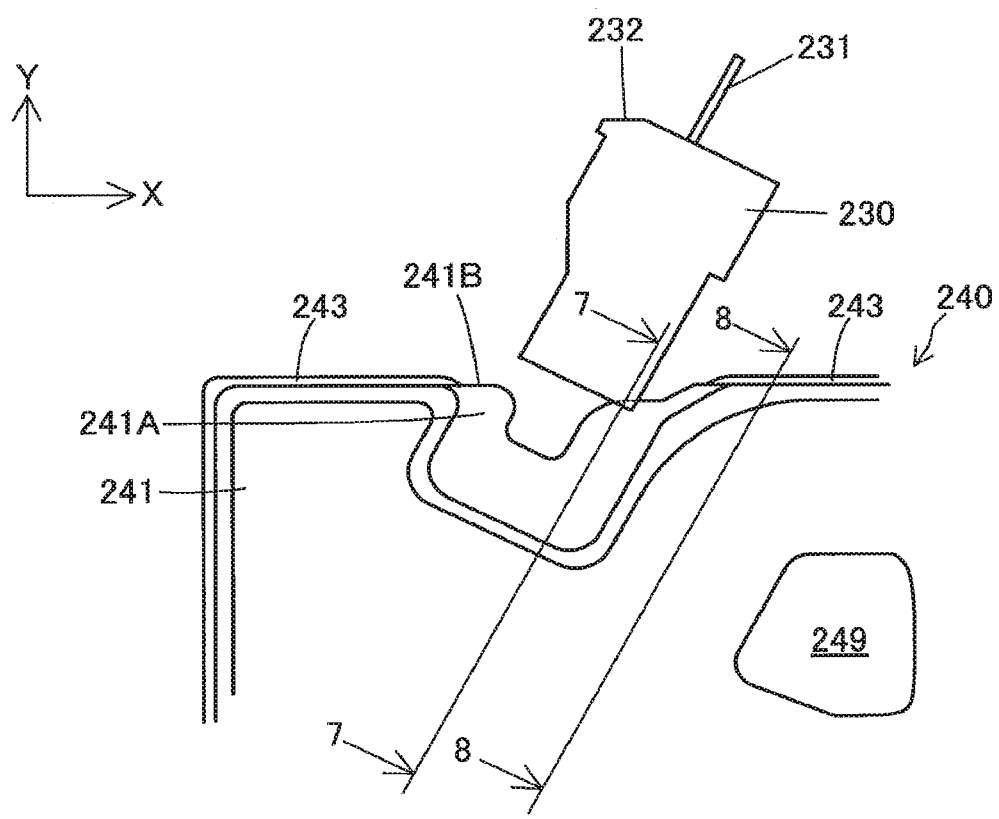
FIG. 5 is a diagram illustrating attachment of a connector.
Figure 6:
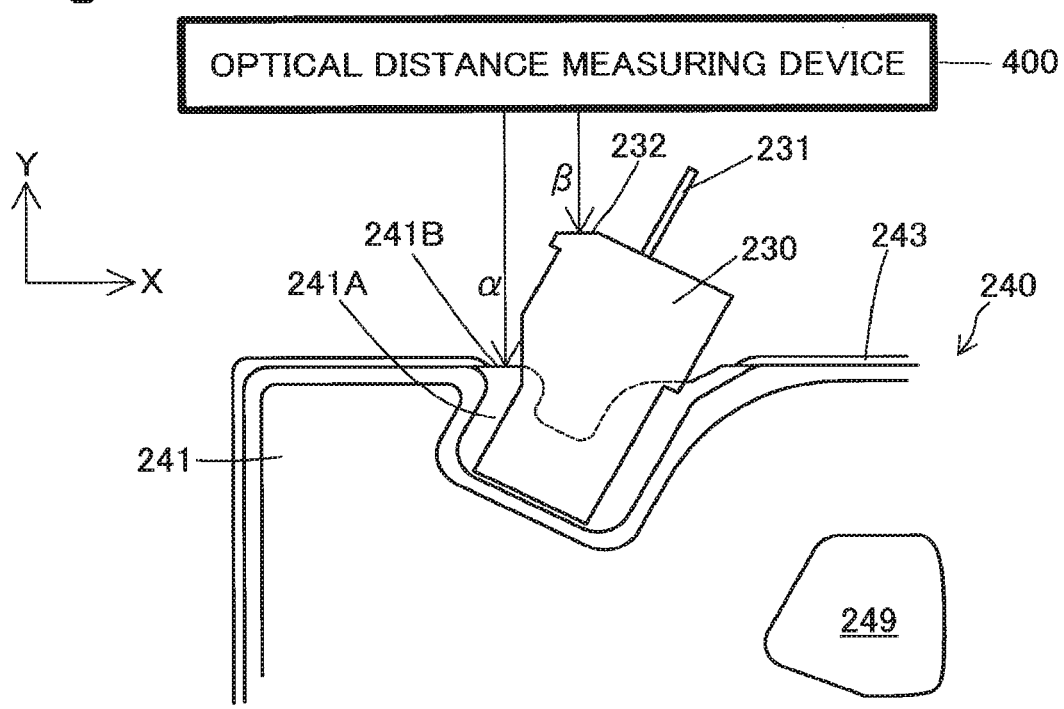
FIG. 6 is a diagram illustrating an inspection of attachment failure of the connector.

The casing 200 places the plurality of cells 240 therein. The motor 220 is fixed to an upper portion of the casing 200. Each of the plurality of connectors 230 is for use in measuring a cell voltage. The plurality of connectors 230 are respectively connected with the monitor 220 via cables. The cables 231 are not shown in FIG. 1 but are illustrated in FIGS. 5 and 6. The cell 240 is a unit cell. The connector 230 is an electric connector.

A connecting portion 221 is provided on a top of the monitor 220. Detection results of the monitor 220 will be obtained with a plug inserted to the connecting portion 221. The detection results denote voltages generated by the respective cells 240.

Figure 2:
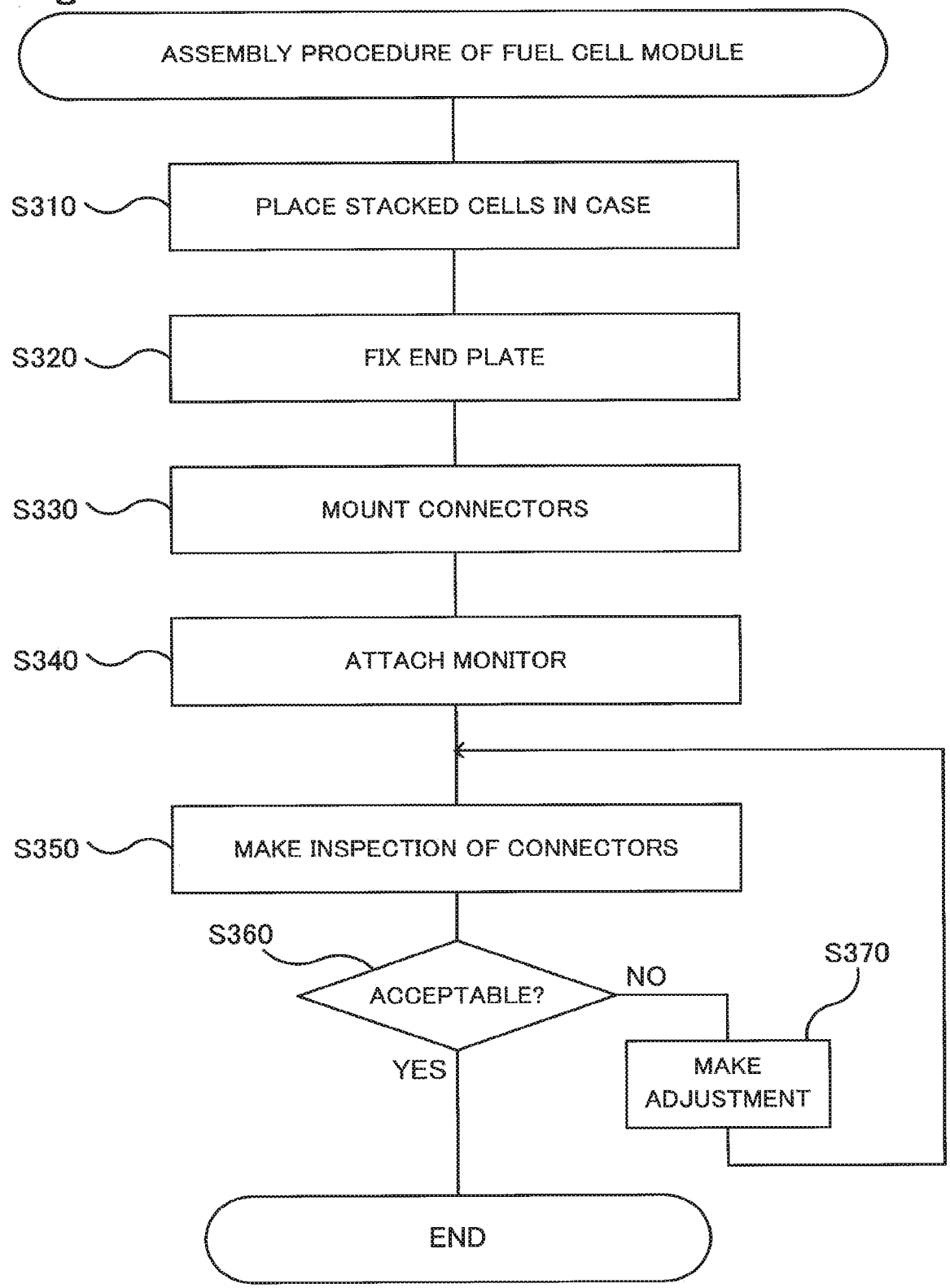
FIG. 2 is a flowchart showing an assembling procedure of the fuel cell module.
Figure 3:
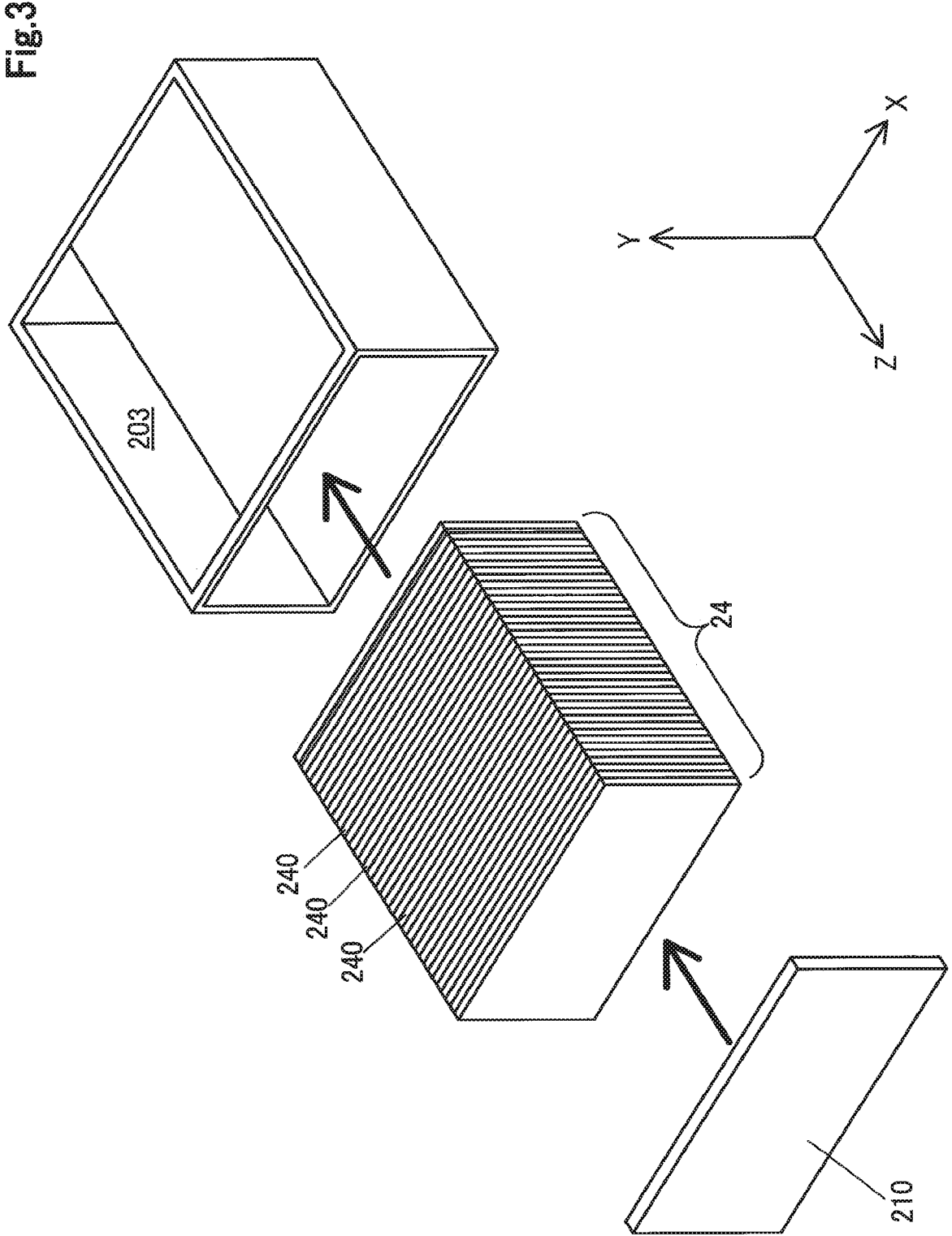
FIG. 3 is a perspective view illustrating a process of placing cells in a casing and a process of attaching an end plate.

FIG. 2 is a flowchart showing an assembling procedure of the fuel cell module 10. As shown in FIG. 3, the operator places a stack 24 in the casing 200 in step S310. The stack 24 is comprised of the plurality of stacked cells 240.

As shown in FIG. 3, the casing 200 includes an opening 203. The opening 203 opens part of an upper face of the casing 200.

The cell 240 has an approximately rectangular outer shape as shown in FIG. 3. In other words, projection of the cell 240 on the XY plane provides an approximately rectangular outer shape.

Figure 4:
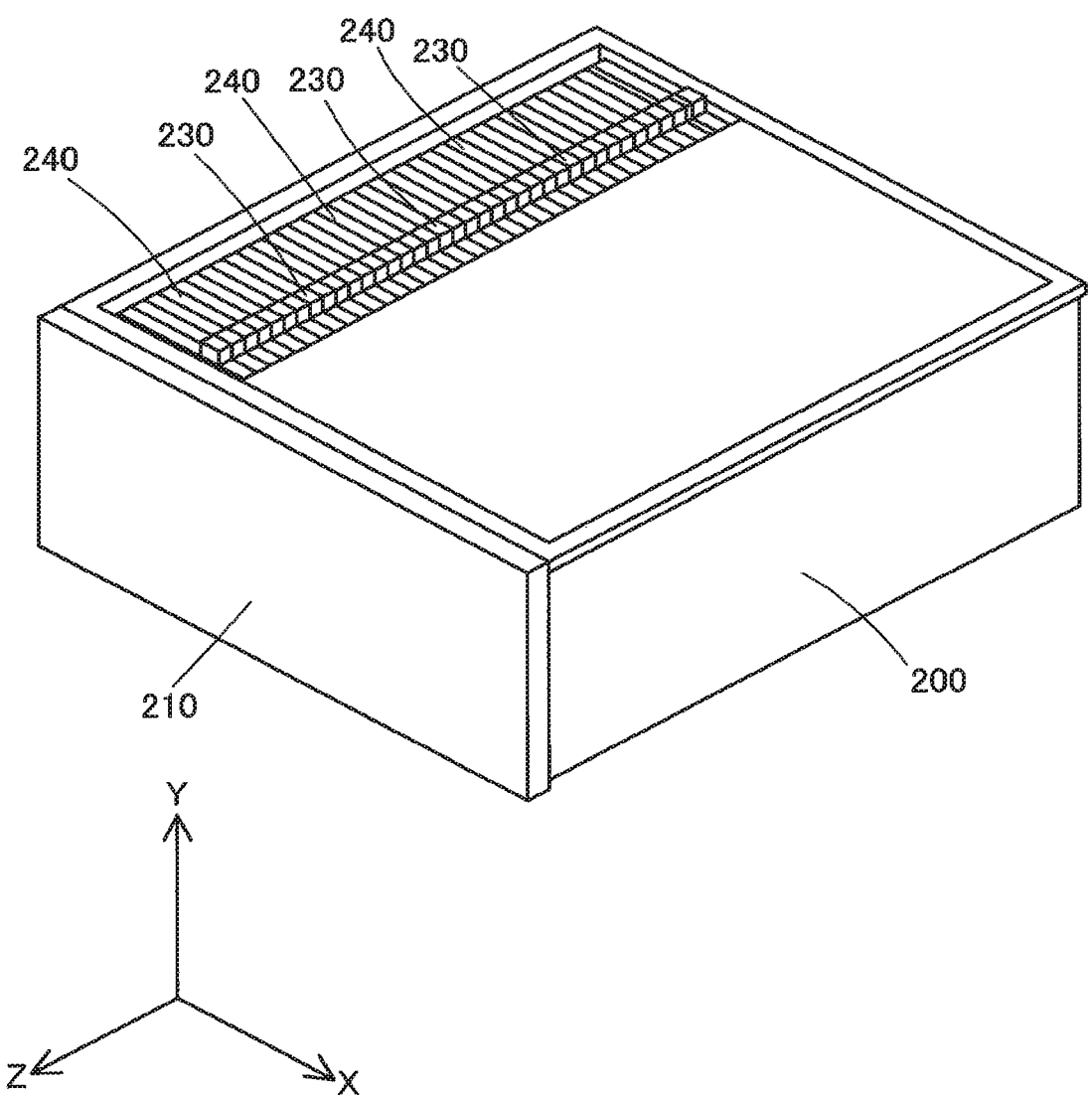
FIG. 4 is a perspective view illustrating attachment of connectors.

The operator subsequently fixes the end plate 210 in step S320. The operator then attaches the connectors 230 to the cells 240 in step S330. The connectors 230 are attached in a location that is exposed by the opening 203 as shown in FIG. 4.

The operator subsequently attaches the monitor 220 in step S340 and makes an inspection of attachment of the connectors 230 in step S350. The inspection will be described later. When the inspection result indicates acceptable (step S360: YES), assembling the fuel cell module 10 shown in FIG. 1 is completed.

When the inspection result indicates failed (step S360: NO), on the other hand, the operator makes adjustment in step S370 and performs the processing of steps S350 and S360 again. The adjustment herein denotes an operation of moving the connector 230 that is detected as attachment failure to a proper position.

Figure 7:
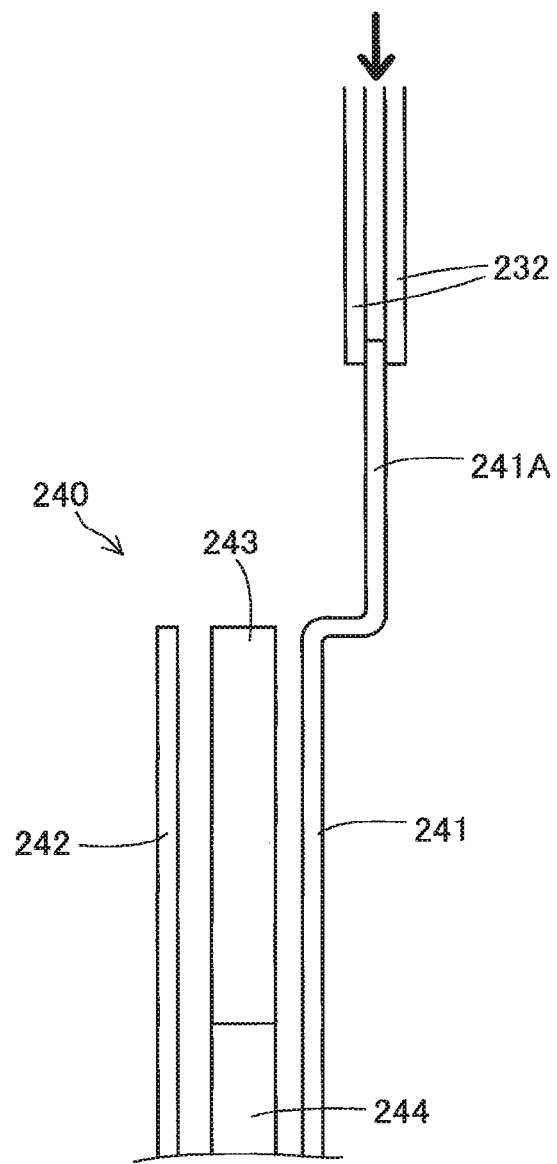
FIG. 7 is a sectional view taken along a line 7-7 in FIG. 5.
Figure 8:
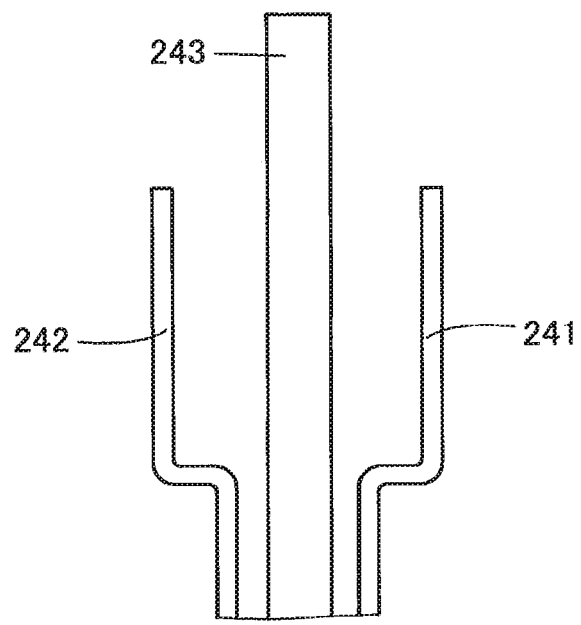
FIG. 8 is a sectional view taken along a line 8-8 in FIG. 5.

FIG. 5, FIG. 6, FIG. 7 and FIG. 8 are drawings illustrating the processing of steps S330 and S350 more in detail. FIG. 5 and FIG. 6 are side views illustrating one cell 240 and one connector 230. FIG. 7 is a sectional view taken along a line 7-7 in FIG. 5. FIG. 8 is a sectional view taken along a line 8-8 in FIG. 5.

As shown in FIGS. 7 and 8, the cell 240 includes a first separator 241, a second separator 242, an insulating frame 243 and a membrane electrode assembly 244. The insulating frame 243 is placed between the first separator 241 and the second separator 242 to isolate the first separator 241 and the second separator 242 from each other.

An attachment portion 241A is provided on the first separator 241. The attachment portion 241A is formed on an edge of the first separator 241. The connector 230 is attached to the attachment portion 241A. As shown in FIGS. 5 and 6, the connector 230 is moved obliquely relative to the first separator 241. The term "obliquely" herein denotes inclination by a rotation about the Z direction. The operator feels that the connector 230 approaches the operator's body when moving the connector 230.

The primary purpose for obliquely moving the connector 230 in the attaching operation is to ensure a gap between the attachment portion 241A and a through hole 249. The through hole 249 forms a manifold in the assembled state of the fuel cell module 10.

The operator may properly move the connector 230 in the XY plane direction (i.e., direction parallel to the planar direction of the cell 240) with some jig. The operator presses the connector 230 into a predetermined position to complete the attachment of the connector 230.

Attachment failure occurs when the operator stops pressing the connector 230 before the connector 230 reaches the predetermined position. The step S350 makes an inspection of such attachment failure.

An optical distance measuring device 400 is used for the inspection in step S350. The optical distance measuring device 400 is an inspection device configured to optically measure the attachment position of the connector 230 relative to the position of the first separator 241. The optical distance measuring device 400 emits light in the Y direction, and the measured position is a position in the Y direction.

A reference plane 241B is used as a reference portion of the first separator 241. The reference plane 241B is part of the edge of the first separator 241. The edge including the reference plane 241B forms a plane parallel to the ZX plane. The edge including the reference plane 241B corresponds to one side of the approximately rectangular outer shape of the cell 240.

An inspection plane 232 is used as a reference portion of the connector 230. The inspection plane 232 is formed to be parallel to the reference plane 241B in the state that the connector 230 is properly attached to the attachment portion 241A.

The optical distance measuring device 400 performs the determination of step S360 as described below. A distance from the optical distance measuring device 400 to the reference plane 241B is defined as a distance $\alpha$. A distance from the optical distance measuring device 400 to the inspection plane 232 is defined as a distance $\beta$. The optical distance measuring device 400 obtains the distance $\alpha$ and the distance $\beta$ and subsequently determines whether a difference ($\alpha-\beta$) is in a predetermined range. The predetermined range is set as an allowable range by taking into account a tolerance. The difference ($\alpha-\beta$) corresponds to a distance from the reference plane 241B to the inspection plane 232.

The optical distance measuring device 400 notifies the operator of a determination result that indicates acceptable when the difference ($\alpha-\beta$) is in the predetermined range but otherwise indicates failed. When the notification indicates failed, the operator makes the adjustment in step S370. When the notification indicates acceptable, the fuel cell module 10 is regarded as an acceptable product.

The embodiment will make an inspection of the attachment position of the connector 230 with high accuracy. This advantageous effect is mainly attributable to: (1) measurement is made between parallel planes; (2) measurement is made with the attachment target cell 240 used as a reference; and (3) the attachment portion 241A is protruded toward outside and exposed.

The above factor (2) is described more. Unlike Embodiment 1, it is possible to employ a reference portion that is other than the attachment target cell 240 for the measurement. In a comparative example, a positional misalignment between inspection planes 232 of adjacent connectors 230 may be measured, and the inspection may be made based on this measurement result. This inspection method, however, has a lower accuracy compared with the accuracy of Embodiment 1 as described below.

Figure 9:
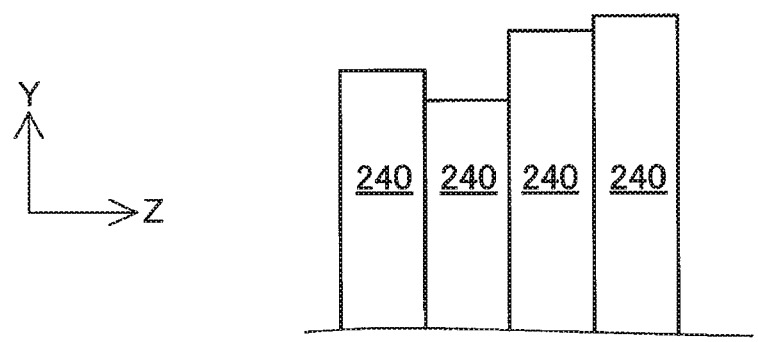
FIG. 9 is a diagram illustrating a positional misalignment of cells in a Y direction.

FIG. 9 illustrates four cells 240 extracted from the stack 24 according to the embodiment. FIG. 9 illustrates the cells 240 by simplified outer shapes. FIG. 9 illustrates a positional misalignment in the Y direction of the cells 240 included in the stack 24. It is impractical to fully eliminate such a positional misalignment in manufacture, so that a positional misalignment to a predetermined level is allowed in manufacture.

In the comparative example described above, the influence of the positional misalignment of the cells 240 in the Y direction may cause a failure of the inspection. Embodiment 1, on the other hand, makes an accurate inspection because the attachment target cell 240 itself is used as a reference.

Figure 10:
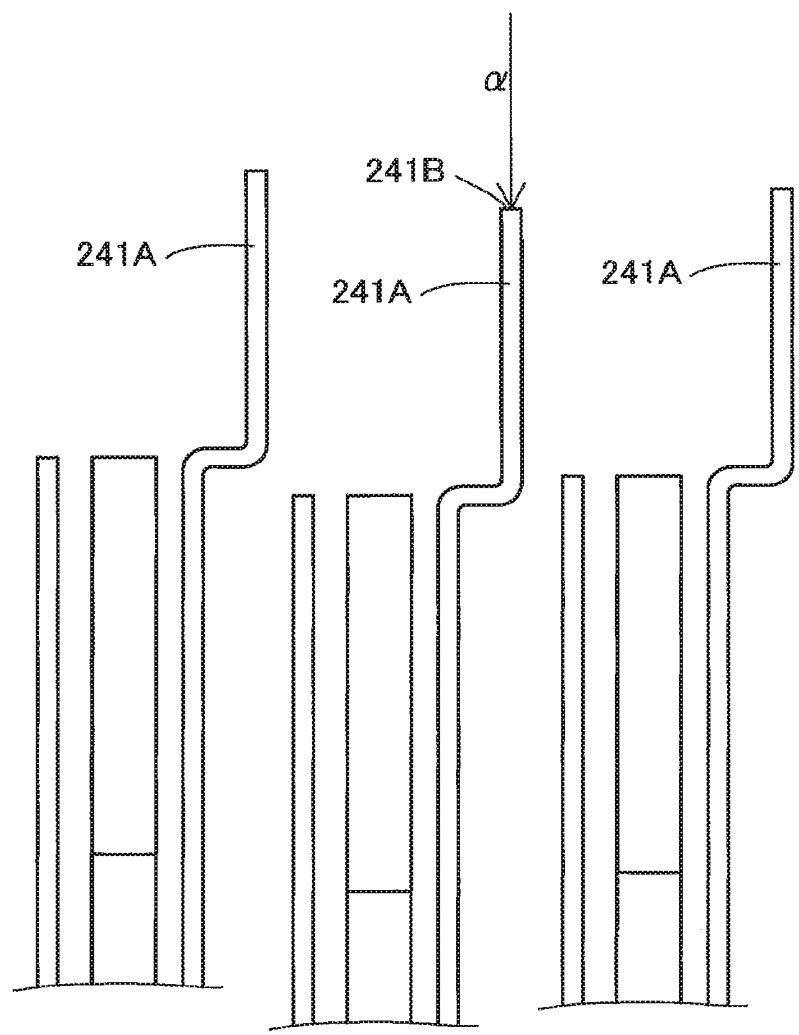
FIG. 10 is a diagram illustrating irradiation of a reference plane with measurement light.

The above factor (3) is described more, FIG. 10 is a sectional view illustrating three adjacent cells 240 according to Embodiment 1, taken along 7-7 in FIG. 5, like FIG. 7.

Figure 11:
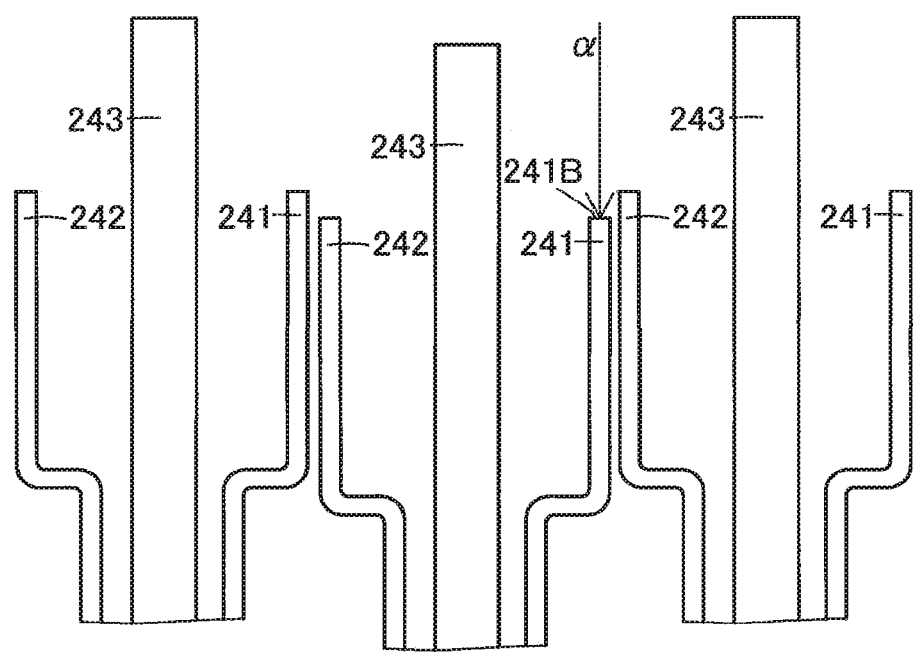
FIG. 11 is a diagram illustrating irradiation of a reference plane with measurement light according to Embodiment 2.

FIG. 11 is a sectional view illustrating three adjacent cells 240 according to Embodiment 2, taken along 7-7 in FIG. 5, like FIG. 7. The description of Embodiment 2 mainly regards the configuration different from that of Embodiment 1. The configuration that is not specifically described below is the same with that of Embodiment 1.

As shown in FIG. 11, the attachment portion 241A is not protruded toward outside of and exposed from the second separator 242 and the insulating frame 243 according to Embodiment 2. A reference plane 241B is located near to the insulating frame 243 and the second separator 242 of the adjacent cell 240 according to Embodiment 2, as shown in FIG. 11.

This positional relationship does not substantially change the value α even when the insulating frame 243 or the second separator 242 is irradiated with measurement light, compared with the value α when the attachment portion 241A is accurately irradiated with measurement light. It is accordingly difficult to detect wrong irradiation of the insulating frame 243 or the second separator 242 with measurement light. Employing the value α when the insulating frame 243 or the second separator 242 is wrongly irradiated with measurement light is likely to cause a false determination in step S360. More specifically, attachment failure of the connector 230 is likely to be determined as acceptable in step S360.

According to Embodiment 1, on the other hand, the attachment portion 241A is protruded toward outside of and exposed from the insulating frame 243 and the second separator 242 of the adjacent cell 240, as shown in FIG. 10. This positional relationship will substantially change the value α when the insulating frame 243 or the second separator 242 is irradiated with measurement light. As a result, attachment failure of the connector 230 is unlikely to be determined as acceptable in S360.

The disclosure is not limited to any of the aspects and the embodiments described above but may be implemented by a diversity of other configurations without departing from the scope of the disclosure. For example, the technical features of any of the aspects and the embodiments corresponding to the technical features of each of the aspects described in Summary may be replaced or combined appropriately; in order to solve part or all of the problems described above or in order to achieve part or all of the advantageous effects described above. Any of the technical features may be omitted appropriately unless the technical feature is described as essential herein. One example of another configuration is given below.

The reference plane on the cell side may be part of the insulating frame or may be part of the second separator.

What is claimed is:

1. A manufacturing method of a fuel cell module, comprising the steps of:
    attaching a connector to at least one of a plurality of cells, each having an approximately rectangular outer shape, in order to measure a voltage of the cell; and
    making an inspection to determine whether an attachment position of the connector is acceptable, wherein
    the step of attaching the connector includes moving the connector obliquely to an edge of the cell that forms one side of the approximately rectangular outer shape, so as to attach the connector to the edge of the cell,
    the connector includes a plane that is arranged parallel to a reference plane that is part of the edge of the cell in an accurately attached state of the connector, and
    the step of making the inspection includes optically measuring a distance from the plane that is parallel to the reference plane, to the reference plane, so as to make the inspection.

2. The manufacturing method of the fuel cell module according to claim 1,
    wherein each of the plurality of cells includes a first separator, a second separator, and an insulating frame that is placed between the first separator and the second separator to isolate the first separator and the second separator from each other,
    the step of attaching the connector includes attaching the connector to the first separator, and
    the reference plane is part of the first separator.

3. The manufacturing method of the fuel cell module according to claim 2,
    wherein the first separator includes an attachment portion configured to attach the connector, and
    the attachment portion is exposed from the insulating frame.

* * * * *